United States Patent Office 2,837,525
Patented June 3, 1958

2,837,525

1-THIENYL-1-CYCLOALKYL(OR ARYL)-3-(ALIPHATIC - TERTIARY-AMINO)-1-HYDROXY-LOWER-ALKANES AND PREPARATION THEREOF

Arlo Wayne Ruddy, Morris Plains, N. J., and Theodore J. Becker, deceased, late of Albany, N. Y., by Maurice L. Tainter, administrator, Elsmere, N. Y., assignors to Sterling Drug Inc., a corporation of Delaware No Drawing. Application July 12, 1955
Serial No. 521,616

23 Claims. (Cl. 260—293.4)

This invention relates to 1-thienyl-1-cycloalkyl (or aryl) - 3 - (aliphatic - tertiary - amino)-1-hydroxy-lower-alkanes, salts thereof, and the process for their preparation. The compounds of the invention have the general structure

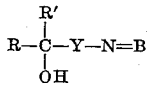

wherein R is a cycloalkyl radical or an aryl radical of benzene, naphthalene or biphenyl, R' is a thienyl radical, Y is an ethylene group which can be substituted with lower-alkyl groups, and —N=B is an aliphatic type tertiary-amino group.

Pharmacological evaluation of the compounds of the invention by the Magnus method has shown that these substances possess anticholinergic activity, which indicates that these compounds are useful as antispasmodics. The purpose of antispasmodic agents is to relieve spasms of the smooth muscles. These spasms may be caused (1) by exaggerated impulses from the autonomic nervous system which create violent contractions in the muscle or (2) stimulation of the muscle by chemical changes in the surrounding tissues. Atropine has the ability of relieving the first type of spasms, and its action is therefore known as "neurotropic." Papaverine counteracts spasms of the second type and hence its action is "musculotropic."

The compounds of the present invention have been studied for their ability to reduce spasms in smooth muscle by acetylcholine in strips of rabbit ileum, and compared to atropine for their neurotropic effects. The compounds of the invention are characterized in general by considerable atropine-like action.

In the above general formula, R represents a cyclo-alkyl group, preferably one having from five to six carbon atoms in the ring, thus including cyclopentyl and cyclohexyl and lower-alkylated derivatives thereof such as 4-methylcyclohexyl, 3-ethylcyclopentyl, 2,4-dimethylcyclohexyl, and the like, wherein the lower-alkyl groups contain from one to about four carbon atoms. R can also represent an aryl radical of one or two rings optionally bearing inert substituents such as halo, alkyl or alkoxy. Examples of such groups include phenyl, chlorophenyl, anisyl, xenyl and naphthyl.

In the above general formula, R' represents a thienyl radical, and can be the 2-thienyl group, the 3-thienyl group, or such groups substituted by from one to three lower-alkyl groups, preferably having from one to four carbon atoms each.

In the above general formula, Y represents the ethylene group or an ethylene group substituted by one or more lower-alkyl groups having from one to about four carbon atoms, such as methyl, ethyl, propyl, isopropyl, butyl, and the like. Y is therefore a lower-alkylene radical having the free valence bonds on adjacent carbon atoms, and thus includes such groups as ethylene, —CH₂CH₂—; 1-methylethylene, —CHCH(CH₃)—; 1,1-dimethylethylene, —CHC(CH₃)₂—; 1,2-dimethylethylene,

—CH(CH₃)CH(CH₃)—

1-ethylethylene, —CH₂CH(C₂H₅)—; 1-isopropylethylene, —CH₂CH[CH(CH₃)₂]—; and the like. The radical Y preferably contains from two to about six carbon atoms.

In the above general formula, N=B represents an aliphatic type tertiary-amino group of the type NXX' wherein X and X' are aliphatic groups having from one to about six carbon atoms which can be joined to form saturated heterocyclic groups, such as piperidyl, pyrrolidyl, morpholinyl, and the like. Such cyclic amino groups may be considered aliphatic type amino radicals since they do not have complete, conjugate unsaturation, do not exhibit aromatic properties (cf. Gilman Organic Chemistry, second edition, vol. 1, pages 126–127, 1943), and behave like simple aliphatic amines. A preferred class of the radical N=B comprises di-lower-alkylamino groups, in which the alkyl groups, which can be the same or different, have from one to about six carbon atoms and can be straight or branched, thus including dimethylamino, methylethylamino, diethylamino, dipropylamino, diisopropylamino, dibutylamino, dihexylamino, and the like; and the heterocyclic groupings 1-pyrrolidyl, 1-piperidyl, 4-morpholinyl and lower-alkylated derivatives thereof, such as 2-methylpiperidino, 3-ethylpyrrolidino, 3,5-dimethylmorpholino, and the like.

The compounds of the invention are prepared by reacting a ketone having the general structure

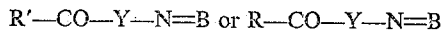

with an organometallic compound of the formula RM or R'M, respectively, followed by hydrolysis of the intermediate organometallic complex formed. The substituents R, R', Y and N=B have the meanings given above, and M stands for an alkali metal such as sodium, potassium or lithium or a halogen-metal group such as halomagnesium. The organometallic compound can be any of the usual forms which react with ketones to form tertiary alcohols. These types include the Grignard reagent, in which M stands for the halo-magnesium group; the alkyl- and aryl-sodium, -potassium or -lithium compounds wherein M stands for Na, K, and Li, respectively; and related compounds. The amino ketone can be used either in the form of the free base or its acid-addition salt, e. g., the hydrochloride. When a salt of the amino ketone is used, part of the organometallic compound is consumed by the acid, but this is not a serious disadvantage since an excess of the organometallic reagent is generally employed.

The conditions under which the reaction of the ketone and the organometallic compound takes place or not critical. The reaction will occur at room temperatures, although it is preferred to heat the reaction mixture to a temperature of about 50–100° C., conveniently at the boiling point of the inert solvent used as a reaction medium, in order to speed up the reaction.

The amino ketones,

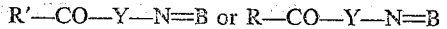

which are the starting materials for the preparation of the compounds of the invention, can be synthesized by a variety of methods well understood by those skilled in the art. A preferred method is based on the Mannich reaction, which comprises reacting a ketone, R'COCH₂R" or RCOCH₂R", wherein R" is hydrogen or lower-alkyl, with formaldehyde and a tertiary-amine, HN=B. The reaction is illustrated by the preparation of β-diethylamino-isopropyl cyclohexyl ketone from ethyl cyclohexyl ketone, formaldehyde and diethylamine hydrochloride.

The carbon atom to which are joined the hydroxyl group, thienyl group and cycloalkyl (or aryl) group is asymmetric, and therefore the compounds of the invention can exist in optically active forms. These optical isomers are within the purview of the invention, and can be prepared by resolution of the racemic form. The resolution is effected by reacting the racemic base with an optically active acid, and separating the diastereoisomeric salts thus formed by fractional crystallization. The separated diastereoisomeric salts can be converted to the respective optically active bases by treatment with any strong base, e. g., sodium hydroxide.

The compounds of the invention can be prepared and used in the form of water-soluble acid-addition or quaternary ammonium salts, the anions of which are non-toxic to animal organisms in therapeutic doses of the salts. In other words, the anions should not substantially increase the toxicity inherent in the cations. Appropriate acid-addition salts are those derived from mineral acids such as hydrochloric acid, hydrobromic acid, hydriodic acid, nitric acid, phosphoric acid, and sulfuric acid, and organic acids such as acetic acid, citric acid, tartaric acid, lactic acid, quinic acid, and the like, giving the hydrochloride, hydrobromide, hydriodide, nitrate, phosphate or acid phosphate, sulfate or bisulfate, acetate, citrate or acid citrate, tartrate or bitartrate, lactate, and quinate salts, respectively. The quaternary ammonium salts of the invention are derived from the addition of an ester of a strong inorganic or organic acid to the free base form of the compound. Exemplary of a preferred class of the quaternary ammonium salts of the invention are those obtained by the addition of alkyl, alkenyl or aralkyl esters of strong inorganic acids or organic sulfonic acids to the free base form of the compounds. The alkyl, alkenyl or aralkyl esters so used include compounds such as methyl chloride, methyl bromide, methyl iodide, ethyl bromide, propyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, p-methylsulfonylbenzyl bromide, and the like.

The acid-addition and quaternary ammonium salts are prepared by reacting the free base with an acid or ester, respectively, as exemplified above. The reaction is preferably carried out in an inert solvent, and heating may be used to facilitate the reaction although it is not essential. The acid-addition or quaternary ammonium salt separates directly or can be obtained by concentration of the solution.

The following examples will further illustrate the invention without however limiting same thereto.

EXAMPLE 1

*1-(2-thienyl)-1-cyclohexyl-3-diethylamino-1-propanol hydrochloride*

Cyclohexyl bromide (308 cc.) was added to a refluxing suspension of 60.8 g. of magnesium turnings in 1200 cc. of dry ether. The reaction mixture was refluxed for two hours, and 800 cc. of dry benzene was then added, followed by 62 g. of β-diethylaminoethyl 2-thienyl ketone hydrochloride, added over a period of fifteen minutes at 30–40° C. A portion of the solvent was distilled off until the internal temperature reached 72° C., and the remaining mixture was allowed to reflux for seventy-five minutes. The reaction mixture was cooled to 20° C., added to an aqueous solution of 430 g. of ammonium chloride containing cracked ice, and stirred for five minutes. The aqueous layer was separated and extracted with ether. The organic layers were combined, washed twice with water and extracted with 200 cc. of water containing 25 cc. of concentrated hydrochloric acid. The aqueous acidic layer was separated, washed with ether and then made basic by the addition of concentrated ammonium hydroxide. The basic product was extracted twice with benzene, and the benzene extracts were concentrated, giving a residue of 39 g. of an amber colored oil. The oil, which contained the free base, 1-(2-thienyl)-1-cyclohexyl-3-diethylamino-1-propanol, was dissolved in 100 cc. of acetone, and 25 cc. of 18% hydrogen chloride in ethanol was added to the solution at 0° C. The solid material which separated was collected by filtration and recrystallized twice from 40 cc. of isopropyl alcohol, giving 8 g. of 1-(2-thienyl)-1-cyclohexyl-3-diethylamino-1-propanol hydrochloride, M. P. 181–184° C. (corr.).

*Analysis.*—Calcd. for $C_{17}H_{29}NOS \cdot HCl$: Cl, 10.98; S, 9.68. Found: Cl, 10.93; S, 9.60.

1 - (2 - thienyl) - 1 - cyclohexyl - 3 - diethylamino-1-propanol hydrochloride was found to be active as an antispasmodic at a dilution of about 1 part in 1,480,000 when tested according to the modified Magnus method [Miller, Becker and Tainter, Journal of Pharmacology and Experimental Therapeutics 92, 260 (1948)].

EXAMPLE 2

*1-(2-thienyl)-1-cyclohexyl-3-(1-piperidyl)-1-propanol hydrochloride*

A few drops of ethyl bromide was added to a suspension of 13.1 g. of magnesium turnings in 250 cc. of dry ether. After reaction had been initiated there was added 66.5 cc. of cyclohexyl bromide over a period of forty-five minutes, allowing the ether to reflux without external cooling. The reaction mixture was refluxed for two and one-half hours longer, and then a solution of 60 g. of 2-(1-piperidyl)ethyl 2-thienyl ketone in 150 cc. of dry benzene was added. The temperature was allowed to rise during the addition and solvent was collected by downward distillation. An additional 200 cc. of benzene was added, the distillation was continued until an internal temperature of 72° C. was reached, and the remaining mixture was refluxed for one hour. The reaction mixture was allowed to cool and stand for about fifteen hours and then poured into a mixture of 100 g. of ice, 200 cc. of water and 54 g. of ammonium chloride with stirring. The mixture was filtered, the layers were separated, the aqueous layer extracted with benzene and the combined organic layers washed twice with water. The solvent was concentrated, and the residue was subjected to vacuum distillation, removing all material boiling up to 105° C. (0.6 mm.) which constituted about 32 g. of recovered 2-(1-piperidyl)ethyl 2-thienyl ketone. The distillation residue (25 g.) was dissolved in 75 cc. of isopropyl alcohol, and 6.8 cc. of concentrated hydrochloric acid and 75 cc. of acetone were added. Upon cooling, crystalline material separated which was collected by filtration and recrystallized from ethanol, using activated charcoal for decolorizing purposes. There was thus obtained 8 g. of 1-(2-thienyl)-1-cyclohexyl-3-(1-piperidyl)-1-propanol hydrochloride, M. P. 222.5–224° C. (corr.).

*Analysis.*—Calcd. for $C_{18}H_{29}NOS \cdot HCl$: N, 4.07; S, 9.32. Found: N, 4.08; S, 9.45.

1 - (2 - thienyl) - 1 - cyclohexyl - 3 - (1 - piperidyl)-1-propanol hydrochloride was found to be active as an antispasmodic at a dilution of about 1 part in 10,000,000 when tested by the modified Magnus method.

EXAMPLE 3

*Resolution of 1-(2-thienyl)-1-cyclohexyl-3-(1-piperidyl)-1-propanol*

(a) *Racemic base.*—A solution of 50 g. of 1-(2-thienyl)-1-cyclohexyl-3-(1-piperidyl) - 1 - propanol hydrochloride in 250 cc. of hot water was treated with 15 ml. of concentrated ammonium hydroxide. The semi-solid base which separated was extracted with ether and the ether was removed by distillation. The residue was recrystallized from 50 ml. of isopropyl alcohol, giving 38 g. of racemic 1-(2-thienyl)-1-cyclohexyl-3-(1-piperidyl)-1-propanol, M. P. 75–77° C.

(b) *Resolution.*—Racemic 1-(2-thienyl)-1-cyclohexyl-3-(1-piperidyl)-1-propanol (38 g.) and 19 g. of dextro-tartaric acid were dissolved in 400 ml. of 90% methanol, and the solution was kept at 25° C. for several days. The crystalline precipitate which had formed was collected by filtration, washed with a small quantity of ethanol and dried in vacuo, giving 17.3 g. of dextro-1-(2-thienyl)-1-cyclohexyl-3-(1-piperidyl)-1-propanol dextro-bitartrate, M. P. 90–110° C. The melting point was unchanged after two recrystallizations from 95% ethanol.

(c) *Dextro-1-(2-thienyl)-1-cyclohexyl-3-(1-piperidyl)-1-propanol.*—Dextro-1-(2-thienyl)-1-cyclohexyl-3-(1-piperidyl)-1-propanol dextro-bitartrate (6.5 g.) was dissolved in 100 cc. of hot water. The solution was cooled, made basic with an excess of ammonium hydroxide, and the base which separated was extracted with ether. The ether extracts were evaporated, and the residue was crystallized from 20 ml. of 95% ethanol, giving 2.6 g. of dextro-1-(2-thenyl)-cyclohexyl-3-(1-piperidyl) - 1 - propanol, M. P. 82–87° C. (corr.), $[\alpha]_D^{25} = +25.3°$ (0.5% in 95% ethanol).

*Analysis.*—Calcd. for $C_{18}H_{29}NOS$: N, 4.56; S, 10.4. Found: N, 4.62; S, 10.1.

(d) *Levo-1-(2-thienyl)-1-cyclohexyl-3-(1 - piperidyl)-1-propanol.*—The mother liquors from the separation of the dextro-isomer in part (b) above were concentrated to dryness in vacuo. The residue (26 g.) was dissolved in 200 cc. of water and made basic with an excess of ammonium hydroxide. The product which separated was extracted with ether and the ether extracts were concentrated. The residue was recrystallized from 95% ethanol, giving 11 g. of levo-1-(2-thienyl)-1-cyclohexyl-3-(1-piperidyl)-1-propanol, M. P. 72–79° C. Further purification was effected as follows: 9.0 g. of the levo-isomer, M. P. 72–79° C., and 4.5 g. of levo-tartaric acid were dissolved in 100 ml. of 95% ethanol, and the salt was allowed to crystallize at 25° C., giving 6.5 g. of levo-1-(2-thienyl)-1-cyclohexyl-3-(1-piperidyl) - 1 - propanol levo-bitartrate, M. P. 90–110° C. The bitartrate salt was dissolved in water and converted to the base by treatment with ammonium hydroxide as described above, giving levo-1-(2-thienyl)-1-cyclohexyl-3-(1-piperidyl) - 1 - propanol, M. P. 81.5–83.5° C. (corr.) after recrystallization from 95% ethanol, $[\alpha]_D^{25} = -25.5°$ (0.5% in 95% ethanol).

*Analysis.*—Calcd. for $C_{18}H_{29}NOS$: N, 4.56. Found: N, 4.48.

(e) *Levo-1-(2-thienyl)-1-cyclohexyl-3-(1 - piperidyl)-1-propanol hydrochloride.*—Levo-1-(2 - thienyl)-1-cyclohexyl-3-(1-piperidyl)-1-propanol (2.2 g.) was dissolved in 10 ml. of isopropyl alcohol and treated with 0.55 ml. of concentrated hydrochloric acid. The crystalline material which separated was collected by filtration at 5° C., washed with cold isopropyl alcohol and ether and dried at 60° C., giving 2.2 g. of levo-1-(2-thienyl)-1-cyclohexyl-3-(1-piperidyl)-1-propanol hydrochloride, M. P. 227° C., $[\alpha]_D^{25} = -36.5°$ (0.5% in chloroform), 0° (0.5% in water).

*Analysis.*—Calcd. for $C_{18}H_{29}NOS \cdot HCl$: Cl, 10.31. Found: Cl, 10.43.

(f) *Levo-1-(2-thienyl)-1-cyclohexyl-3-(1-piperidyl)-1-propanol quinate.*—A sample of levo-1-(2-thienyl)-1-cyclohexyl-3-(1-piperidyl)-1-propanol and one equivalent of quinic acid was dissolved in 95% ethanol, and the solution was kept at 25° C. for several hours. The crystalline material which separated was collected by filtration, washed with ethanol and ether and dried at 60° C., giving levo-1-(2-thienyl)-1-cyclohexyl-3-(1-piperidyl) - 1 - propanol quinate, M. P. 168–170° C.

EXAMPLE 4

*1-(2-thienyl)-1-cyclohexyl-3-(1-piperidyl)-1-propanol methobromide*

To a solution of 12 g. (0.035 mole) of racemic 1-(2-thienyl)-1-cyclohexyl-3-(1 - piperidyl)-1-propanol hydrochloride (Example 2) in 200 cc. of boiling water was added an excess of concentrated ammonium hydroxide. The free base which formed as a gum was obtained by decantation and dissolved in a minimum amount of hot isopropyl alcohol. Upon cooling the solution in an ice bath there separated 10 g. of 1-(2-thienyl)-1-cyclohexyl-3-(1-piperidyl)-1-propanol, M. P. 75–77° C. The latter was collected by filtration and dissolved in acetonitrile. The latter was saturated with methyl bromide and then kept at room temperature for about fifteen hours. The product which separated was collected by filtration, recrystallized from isopropyl alcohol, washed with ether and dried at 70° C., giving 7.0 g. of 1-(2-thienyl)-1-cyclohexyl-3-(1-piperidyl)-1-propanol methobromide, M. P. 193.5–195° C. (corr.).

*Analysis.*—Calcd. for $C_{19}H_{32}BrNOS$: C, 56.69; H, 8.01. Found: C, 56.20; H, 7.96.

EXAMPLE 5

1-(2-thienyl)-1-cyclohexyl-2-methyl - 3 - diethylamino-1-propanol was prepared from 45 g. (0.2 mole) of 2-thienyl 2-diethylamino-1-methylethyl ketone (B. P. 105–110° C./1 mm.) and the Grignard reagent prepared from 13.4 g. (0.55 mole) of magnesium turnings, 81.5 g. (0.5 mole) of cyclohexyl bromide and 300 ml. of absolute ether, according to the manipulative procedure described above in Examples 1 and 2. The 1-(2-thienyl)-1-cyclohexyl-2-methyl-3-diethylamino-1-propanol thus obtained distilled at 141–144° C. (1 mm.) and had $n_D^{25} = 1.5200$–1.5225. Its hydrochloride salt had the M. P. 178.5–180° C.

1 - (2-thienyl)-1-cyclopentyl-3-(4-morpholinyl)-1-propanol can be prepared by reacting cyclopentylmagnesium bromide and 2-(4-morpholinyl)ethyl 2-thienyl ketone according to the manipulative procedure described above in Examples 1 and 2. The intermediate 2-(4-morpholinyl)-ethyl 2-thienyl ketone can be prepared by condensation of 2-thienyl methyl ketone, formaldehyde and piperidine according to the Mannich reaction.

1 - (2-thienyl)-1-cyclohexyl-3-(1-pyrrolidyl)-propanol can be prepared by reacting cyclohexylmagnesium bromide and 2-(1-pyrrolidyl)ethyl 2-thienyl ketone according to the manipulative procedure described above in Examples 1 and 2. The intermediate 2-(1-pyrrolidyl)ethyl 2-thienyl ketone can be prepared by condensation of 2-thienyl methyl ketone, formaldehyde and pyrrolidine according to the Mannich reaction.

1 - (3-thienyl)-1-cyclohexyl-3-(1-piperidyl)-1-propanol can be prepared by reacting cyclohexylmagnesium bromide and 2-(1-piperidyl)ethyl 3-thienyl ketone according to the manipulative procedure described above in Examples 1 and 2.

1 - (2 - thienyl) - 1 - (4 - methylcyclohexyl) - 3 - dipropylamino-1-propanol can be prepared by reacting 4-methylcyclohexylmagnesium bromide with 2-dipropylaminoethyl 2-thienyl ketone according to the manipulative procedure described above in Examples 1 and 2. The intermediate 2-dipropylaminoethyl 2-thienyl ketone can be prepared by condensing 2-thienyl methyl ketone, formaldehyde and dipropylamine according to the Mannich reaction.

1 - (2 - thienyl) - 1 - cyclopentyl - 3 - (4 - methyl - 1-piperidyl)-1-propanol can be prepared by reacting cyclopentylmagnesium bromide with 2-(4-methyl-1-piperidyl)-ethyl 2-thienyl ketone according to the manipulative procedure described above in Examples 1 and 2. The intermediate 2-(4-methyl-1-piperidyl)ethyl 2-thienyl ketone can be prepared by condensing 2-thienyl methyl ketone, formaldehyde and 4-methylpiperidine according to the Mannich reaction.

1 - (3,4 - dimethyl - 2 - thienyl) - 1 - cyclohexyl - 3-(1-piperidyl)-1-propanol can be prepared by reacting cyclohexylmagnesium bromide and 2-(1-piperidyl)ethyl 3,4-dimethyl-2-thienyl ketone according to the manipulative procedure described above in Examples 1 and 2. The intermediate 2-(1-piperidyl)ethyl 3,4-dimethyl-2-thienyl ketone can be prepared by condensing 3,4-dimethyl-2-thienyl methyl ketone, formaldehyde and piperidine according to the Mannich reaction.

EXAMPLE 6

1-phenyl-1-(2'-thienyl)-2-methyl-3-(N-piperidyl)-1-propanol $$\text{C}_6\text{H}_5-\underset{\underset{\text{OH}}{|}}{\overset{\overset{\text{S C}_4\text{H}_3}{|}}{\text{C}}}-\underset{\underset{\text{CH}_3}{|}}{\text{CH}}\text{CH}_2\text{NC}_5\text{H}_{10}$$

A solution of 47.6 grams (0.2 mole) of α-(N-piperidyl)-methyl-2-propiothienone (boiling point 120–125 degrees centigrade/1 millimeter; prepared from 2-propiothienone, formaldehyde, and piperidine by the Mannich reaction) in 200 milliliters of dry benzene was added over a period of 50 minutes to a cold (zero degrees centigrade) ether solution of phenylmagnesium bromide, prepared from 13.4 grams (0.55 mole) of magnesium, 78.5 grams (0.5 mole) of bromobenzene, and 300 milliliters of dry ether. The reaction mixture was warmed to 72 degrees centigrade and the ether removed by distillation. The remaining mixture was poured into ice containing 75 milliliters of concentrated hydrochloric acid. To this was added 80 grams of ammonium chloride followed by 150 milliliters of 28 percent ammonium hydroxide. The organic layer was separated and the aqueous layer was extracted with ether. The combined extracts were washed, dried, and evaporated. The residue, which was almost entirely the pure base, was readily crystallized. It also recrystallized from methanol and melted at 103.5–104 degrees centigrade; yield, 46.1 grams.

Its hydrochloride melted at 175.5–176 degrees centigrade.

*Analysis.*—Calcd. for $C_{19}H_{28}ONCIS$: S, 9.11; Cl, 10.07. Found: S, 9.13; Cl, 10.27.

This application is a continuation-in-part of the copending application of A. W. Ruddy and T. J. Becker, Serial No. 421,177, filed April 5, 1954, now abandoned, which is a division of the application of A. W. Ruddy and T. J. Becker, Serial No. 73,442, filed January 28, 1949, now U. S. Patent 2,680,115, which in turn is a continuation-in-part of the application of A. W. Ruddy and T. J. Becker, Serial No. 651,046, filed February 28, 1946, now abandoned.

We claim:

1. A compound selected from the group consisting of 1 - thienyl - 1 - cycloalkyl - 3 - (aliphatic - tertiary - amino) - 1 - hydroxy-lower-alkanes, wherein said cycloalkyl group contains from five to six carbon atoms in the ring, and acid-addition and quaternary ammonium salts thereof.

2. A member of the group consisting of compounds of the formula $$\text{R}-\underset{\underset{\text{OH}}{|}}{\overset{\overset{\text{R}'}{|}}{\text{C}}}-\text{Y}-\text{N}=\text{B}$$

wherein R is a member of the group consisting of cycloalkyl radicals and aryl radicals of benzene, naphthalene and biphenyl, R' is a thienyl radical, Y is a lower-alkylene radical wherein two carbon atoms separate the nitrogen atom from the carbon atom bearing the OH group, and N=B is a tertiary-amino radical selected from the group consisting of lower-dialkylamino, 1-piperidyl, 4-morpholinyl, 1-pyrrolidyl, and lower-alkylated derivatives of said 1-piperidyl, 4-morpholinyl and 1-pyrrolidyl radicals; and acid-addition and quaternary ammonium salts thereof.

3. An acid-addition salt of a compound having the formula $$\text{R}-\underset{\underset{\text{OH}}{|}}{\overset{\overset{\text{R}'}{|}}{\text{C}}}-\text{Y}-\text{N}=\text{B}$$

wherein R is cyclohexyl, R' is a thienyl radical, Y is a lower-alkylene radical wherein two carbon atoms separate the nitrogen from the carbon atom bearing the OH group, and N=B is a di-lower-alkylamino radical.

4. An acid-addition salt of a compound having the formula $$\text{R}-\underset{\underset{\text{OH}}{|}}{\overset{\overset{\text{R}'}{|}}{\text{C}}}-\text{Y}-\text{N}=\text{B}$$

wherein R is cyclohexyl, R' is a thienyl radical, Y is a lower-alkylene radical wherein two carbon atoms separate the nitrogen from the carbon atom bearing the OH group, and N=B is a 1-piperidyl radical.

5. An acid-addition salt of 1-(2-thienyl)-1-cyclohexyl-2-methyl-3-diethylamino-1-propanol.

6. 1 - (2 - thienyl) - 1 - cyclohexyl - 2 - methyl-3-diethylamino-1-propanol hydrochloride.

7. An acid-addition salt of 1-(2-thienyl)-1-cyclohexyl-3-(1-piperidyl)-1-propanol.

8. 1 - (2 - thienyl) - 1 - cyclohexyl - 3 - (1 - piperidyl)-1-propanol hydrochloride.

9. A quaternary ammonium salt of 1-(2-thienyl)-1-cyclohexyl-3-(1-piperidyl)-1-propanol.

10. 1 - (2 - thienyl) - 1 - cyclohexyl - 3 - (1 - piperidyl)1-propanol methobromide.

11. An acid-addition salt of 1-(2-thienyl)-1-cyclohexyl-3-diethylamino-1-propanol.

12. 1 - (2 - thienyl) - 1 - cyclohexyl - 3 - diethylamino-1-propanol hydrochloride.

13. 1 - (2 - thienyl) - 1 - cyclohexyl - 3 - (1 - piperidyl)-1-propanol.

14. Levo - 1 - (2 - thienyl) - 1 - cyclohexyl - 3 - (1-piperidyl)-1-propanol hydrochloride.

15. A process for preparing a 1-thienyl-1-cycloalkyl-3 - (aliphatic - tertiary - amino) - 1 - hydroxy - loweralkane, wherein said cycloalkyl group contains from five to six carbon atoms in the ring, which comprises reacting a 2-(aliphatic-tertiary-amino)-lower-alkyl Z ketone with an organometallic compound having the formula Z'M wherein one of Z and Z' is thienyl and the other of Z and Z' is cycloalkyl, and M is a member of the group consisting of alkali metals and halomagnesium, and hydrolyzing the resultant complex.

16. A process according to claim 15 in which Z is thienyl, Z' is cycloalkyl and M is halomagnesium.

17. The process for preparing a compound of the formula $$\text{R}-\underset{\underset{\text{OH}}{|}}{\overset{\overset{\text{R}'}{|}}{\text{C}}}-\text{Y}-\text{N}=\text{B}$$

wherein R is a member of the group consisting of cycloalkyl radicals and aryl radicals of benzene, naphthalene and biphenyl, R' is a thienyl radical, Y is a lower-alkylene radical wherein two carbon atoms separate the nitrogen from the carbon atom bearing the OH group, and N=B is a tertiary-amino radical selected from the group consisting of di-lower-alkylamino, 1-piperidyl, 4-morpholinyl, 1-pyrrolidyl, and lower-alkylated derivatives of said 1-piperidyl, 4-morpholinyl and 1-pyrrolidyl radicals, which comprises reacting a ketone having the formula Z—CO—Y—N=B with an organometallic compound having the formula Z'M wherein one of Z and Z' is thienyl and the other of Z and Z' is cycloalkyl, and M is a member of the group consisting of alkali metals and halomagnesium, and hydrolyzing the resultant complex.

18. The process according to claim 17 wherein Z is thienyl, Z' is cycloalkyl and M is halomagnesium.

19. The process for preparing a compound having the formula

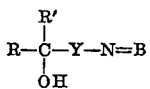

wherein R is cyclohexyl, R' is a thienyl radical, Y is a lower-alkylene radical wherein two carbon atoms separate the nitrogen from the carbon atom bearing the OH group, and N=B is a di-lower-alkylamino radical, which comprises reacting a ketone having the formula R'—CO—Y—N=B with cyclohexylmagnesium halide, and hydrolyzing the resultant complex.

20. The process for preparing a compound having the formula

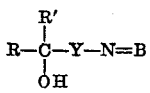

wherein R is cyclohexyl, R' is a thienyl radical, Y is a lower-alkylene radical wherein two carbon atoms separate the nitrogen from the carbon atom bearing the OH group, and N=B is a 1-piperidyl radical, which comprises reacting a ketone having the formula

R'—CO—Y—N=B with cyclohexylmagnesium halide, and hydrolyzing the resultant complex.

21. The process for preparing 1-(2-thienyl)-1-cyclohexyl - 2 - methyl - 3 - diethylamino - 1 - propanol, which comprises reacting 2-thienyl 2-diethylamino-1-methylethyl ketone with cyclohexylmagnesium bromide, and hydrolyzing the resultant complex.

22. The process for preparing 1-(2-thienyl)-1-cyclohexyl-3-(1-piperidyl)-1-propanol, which comprises reacting 2-(1-piperidyl)ethyl 2-thienyl ketone with cyclohexylmagnesium bromide, and hydrolyzing the resultant complex.

23. The process for preparing 1-(2-thienyl)-1-cyclohexyl-3-diethylamino-1-propanol, which comprises reacting 2-diethylaminoethyl 2-thienyl ketone with cyclohexylmagnesium bromide, and hydrolyzing the resultant complex.

References Cited in the file of this patent
UNITED STATES PATENTS 2,680,115    Ruddy et al. _____ June 1, 1954

OTHER REFERENCES

Blicke et al.: JACS, vol. 66, page 1648.